Figure 1:
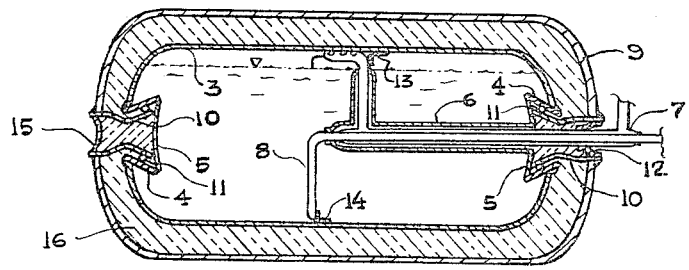

March 21, 1967  R. S. PAULIUKONIS  3,309,884
DEWAR DESIGN FOR STORAGE AND TRANSPORTATION
OF LOW TEMPERATURE FLUIDS
Filed Oct. 11, 1965

INVENTOR.

BY Richard S. Pauliukonis

United States Patent Office 3,309,884
Patented Mar. 21, 1967

3,309,884
DEWAR DESIGN FOR STORAGE AND TRANSPORTATION OF LOW TEMPERATURE FLUIDS
Richard S. Pauliukonis, 6660 Greenbriar Drive, Cleveland, Ohio 44130
Filed Oct. 11, 1965, Ser. No. 494,974
6 Claims. (Cl. 62—45)

This invention relates to the Dewar for storage and transportation of low temperature liquified gases and more particularly to the horizontal Dewar design with improved structural integrity.

Present cryogenic Dewars comprising inner vessel insulated and jacketed by outer vessel employ a variety of physical supports between the two vessels, which are either tubular members, rods, bands, cables or plates. The physical supports holding inner shell of a cryogenic vessel within the outer shell usually makes a substantial contribution to the total heat leak of the Dewar. This heat leak is further augmented if such supports hinder application of insulation, in particular that of multilayer insulation which is sensitive to penetrations normal to the surface it covers. Further, most of the existing supports are subject to dimensional changes when cold liquids are introduced into the inner vessel initially and/or during the service life of such dewars, which normally undergo thermal cycling during filling or cooling the equipment and withdrawal or warming up the same, as well as due to shock and vibration loads. Supports presently in use often become either plastically deformed, due to induced thermal stresses on initial cooling or by impact loads and as such, either change the relative position of inner vessel which may subject the whole insulating material to abnormal loading and subsequent increase in heat leak or fail, due to continuous plastic deformation on cooling and warming, and/or by overloading them physically. Tubular members often serving as both support and liquid conduit consistently induce abnormal heat leak, either by relative position to serve as a support or by changes in service, due to temperature fluctuation, or simply by complex dual function. The object of the present invention is to provide a support system which is durable, economical and relatively simple from structural, as well as functional points.

A further object of the invention is to provide a support system that will reduce heat influx into the inner vessel and thus improve the state of the art of Dewar designs.

Another object of this invention is to provide a support system which entails self-locking provisions during the equipment life for a positive control in positioning inner vessel relative to outer jacket for safe and longer service in transit.

Another object of this invention is to provide location of tubular member communicating between inner and outer vessels and serving as fluid conduits with least interference with insulation proper in the annulus.

In particular, the object of this invention is to provide improvements in the horizontal stationary or portable Dewar design, which can be supported positively from the ends with less complications and minimum heat leak.

Other objects reside in novel details of construction and combination and/or arrangement of parts, all of which will be apparent from the description that follows:

FIGURE 1 presents a cross sectional view of the horizontal Dewar for storing liquified gases, such as liquid air, oxygen, nitrogen, hydrogen, or the like low temperature liquids, with support structure and piping arrangements subject to present invention.

Figure 2:
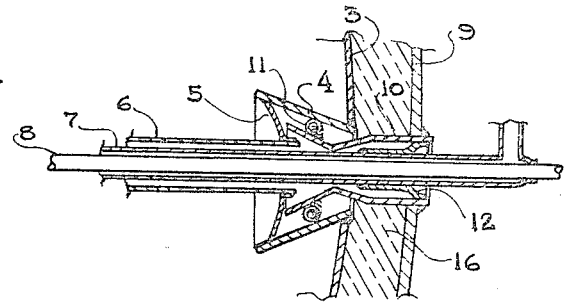

FIGURE 2 presents enlarged view of end support and coaxially mounted vent and fill-withdrawal lines.

As can be seen from FIGURE 1, the inner vessel 3 is provided with conical inserts 4 integrally secured to both ends of the inner vessel head. Their ends facing inside of the inner vessels are covered by hemispherical caps 5. One end closed with cap 5 is provided with a tubular member 6 which serves as an insulating jacket to protect vent line 7 from directly contacting liquid within the inner vessel. Such contact normally creates instability in non-vented vessels by virtue of condensing vapor present within such lines, and allowing condensate to flow toward the warm end at the penetration through the external vessel head and thus undully vaporizing extra liquid with unstable interface between the condensate and vapor. To prevent such occurrence and to reduce undue vaporization, tubular member 6 has been found most effective. Within the vent line 7, the fill and/or withdrawal line 8 is provided to run coaxially with both the vent line 7 and the insulating number 6. This provision is extremely beneficial, in that liquid and/or withdrawal line 8 provided with long insulated jacket 6 minimizes heat influx from outside which in other designs contributes significantly to the boil-off, rendering such systems less economical in storing liquified gases. In this invention, when system is venting, heat influx resulting due to penetration at the jacket head is picked up by the gas or vapor vented. When system is non-venting, the tube dimension between the warm penetration at the jacket head and the cold end in the liquid is large and the heat influx becomes practically insignificant in relationship to the heat gains the Dewars are normally subjected to. The discussed coaxial design also provides design simplicity, in that only one penetration through inner vessel serves multiple purpose of filling and venting, and facilitates easier fabrication of such Dewars.

FIGURE 2 shows enlarged view of the end support section, including tubular members described. As can be seen from FIGURES 1 and 2, the outer jacket 9 is also provided with an insert 10 of double cone design. Between the cone 4 of the inner vessel and the cone 10 of the outer vessel a garter spring 11 is inserted. Spring 11 acts as an interconnecting link between the external jacket 9 and the inner vessel 3, and serves as a structural member to support inner vessel load transmitted through the double cone 10 into the outer jacket, constituting novel features of this design. The inner cone 4, before it becomes sub-assembled with cap 5, receives double cone 10 provided with garter spring 11. The plate 5, with or without tubular jacket 6, is then applied to cone 4. Upon the application of plate 5 to cone 4, the double cone becomes situated and located into position. The greater spring 11 thus becomes wedged between conical surfaces of parts 4 and 10 to stay put through the continuation of assemblies and until the inner vessel becomes cooled by the application of cold liquified gases. The inner vessel when cooled shrinks axially and away from the jacket heads providing additional wedging required for securing spring 11 permanently. Properly balanced garter spring in the described final position locks the whole structure to a rigid system without losing elastic characteristics, in particular those required to sustain impact and vibration loads in transit. The frictional resistance of the garter spring 11 between cones 4 and 10, together with vent tube 7 locked to inside walls of inner vessel at points 13 and 14 on one end and a collar 12 on another end at jacket 9, insures rotational stability of the inner vessel. The contact resistance of garter spring 11 against said cones becomes also the surface which separates warm and cold ends of the structure. Since the passage of heat from the warm end of double cone 10 at the jacket head 9 to the cold cone 4 must be through the garter spring 11, the total heat input is considerably reduced when compared to conventional Dewar design with uninterrupted passages of heat through solid conductors previously mentioned. The end cover 15 at the other end of the vessel serves the purpose of relieving gases which may accumulate within the insulation proper 16.

Although the overall Dewar design, as shown in FIGURES 1 and 2, and in particular the piping arrangements, illustrated represents features necessary for horizontal vessel, the novel support arrangement described is not limited to the horizontal vessels only, as it could be employed on vertical vessels with equal success. Slight modification in piping will then make the invention of support system applicable to both horizontal and vertical Dewars.

What is claimed is:

1. A Dewar assembly for storage of cryogenic fluids comprising an inner fluid-holding vessel, an outer jacket, an insulation between the inner vessel and outer jacket, rigid heads for the inner vessel and outer jacket, support members of conical shape permanently attached to the rigid heads of the inner vessel and outer jacket and hermetically sealed thereafter to enable evacuation of the insulation for optimum performance, a garter spring placed between the conically shaped support members for transmission of loads from inner vessel into the outer jacket at reduced rates of heat leakage to inside vessel, due to resistances created at contact points, said garter spring and support members being assembled in nested shock absorbing relation, means for fluid communication from outside to the inner vessel or vice versa via tubular conduit members coaxially and centrally placed and jacketed for reduced influx of heat, both support members being axially oriented to distribute the lateral load uniformly to both ends of the vessel and to control the central location of the inner vessel relative to the outer jacket during the service life of the Dewar.

2. In a Dewar having a jacket and an inner vessel for housing liquified gases, a support system comprising respectively cold and warm inner and outer conical members and a garter spring, the spring acting as contact resistance between the cold and warm conical members for reduced heat leak from the inner member to outer cone and also serving as a shock absorber, the inner member being permanently attached to the inner vessel with the large cone diameter facing the inside of the vessel and the small cone diameter facing the jacket, the outer cone consisting of a double cone in appearance, of which one end is affixed to the outer jacket rigid head and the other end faces toward the inner vessel for load carrying through the garter spring, the garter spring being located between the two cones and integrally coupling the inner cone with the outer cone when the inner vessel shrinks by the application of coolants to establish a rigid coaxial assembly of said inner vessel relative to the jacket in service, and fluid-conduit means for communicating between the inner vessel and the exterior of the Dewar.

3. In a Dewar having a jacket and an inner vessel housing liquified gases, a piping arrangement passing through coaxially mounted outer and inner cones attached respectively to the jacket head and inner vessel head, a vent line and fill-withdrawal line running centrally and communicating with the inner vessel, means for jacketing said lines within the inner vessel by a tubular surrounding line attached to a cap for the inner cone to form structurally integrated and thermally functional Dewar communications with outside for fluid venting, filling or withdrawal with minimum heat loss.

4. A Dewar having a jacket and an inner vessel, fluid conduit means communicating between the exterior of the Dewar and the interior of the inner vessel, first and second cone means affixed respectively to the jacket and inner vessel and having conical faces that move closer together when the inner vessel is foreshortened relative to the jacket, garter spring means located to be clamped between said conical faces and rigidly interconnecting the first and second cone means at least when the inner vessel is foreshortened as by cooling and hence furnishing structural support between said inner vessel and outer jacket via said cone means and garter spring when said inner vessel holds a cold fluid.

5. A Dewar as defined in claim 4 in which first and second cone means as above recited are provided at each of two opposed ends or heads of the Dewar.

6. A Dewar defined in claim 5 in which the first and second cone means at one end of the Dewar surround the fluid conduit means.

References Cited by the Examiner

UNITED STATES PATENTS

| | | | |
|---|---|---|---|
| 2,396,459 | 3/1946 | Dana | 62—45 |
| 2,513,749 | 7/1950 | Schilling | 62—45 |
| 3,097,084 | 7/1963 | Putman | 62—45 |
| 3,119,238 | 1/1964 | Chamberlain et al. | 62—45 |
| 3,201,946 | 8/1965 | Pauliukonis | 62—45 |

FOREIGN PATENTS 584,660  10/1959  Canada.

LLOYD L. KING, *Primary Examiner.*